US008857626B1

(12) United States Patent
Breinholt et al.

(10) Patent No.: US 8,857,626 B1
(45) Date of Patent: Oct. 14, 2014

(54) ADJUSTABLE VACUUM PAN ASSEMBLIES FOR BELT FILTERS

(71) Applicant: FLSmidth A/S, Valby (DK)

(72) Inventors: Jay Breinholt, South Jordan, UT (US); Joseph L. Wood, Bethlehem, PA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 14/355,663

(22) PCT Filed: Nov. 2, 2012

(86) PCT No.: PCT/US2012/063323
§ 371 (c)(1),
(2), (4) Date: May 1, 2014

(87) PCT Pub. No.: WO2013/067352
PCT Pub. Date: May 10, 2013

Related U.S. Application Data

(60) Provisional application No. 61/555,040, filed on Nov. 3, 2011.

(51) Int. Cl.
B01D 33/64 (2006.01)
B01D 33/74 (2006.01)
A47L 5/12 (2006.01)
B01D 33/04 (2006.01)

(52) U.S. Cl.
CPC .. *B01D 33/04* (2013.01); *A47L 5/12* (2013.01)
USPC .......................................... 210/401; 210/400

(58) Field of Classification Search
USPC .................................... 210/400, 401, DIG. 3
See application file for complete search history.

(56) References Cited

U.S. PATENT DOCUMENTS

| 3,104,223 | A | * | 9/1963 | Kasuya ........................ 210/400 |
| 3,117,462 | A | | 1/1964 | Davis |
| 3,675,597 | A | | 7/1972 | Oddsen et al. |
| 4,065,088 | A | | 12/1977 | Shell |
| 4,336,139 | A | * | 6/1982 | Mueller et al. ................ 210/401 |
| 4,377,480 | A | | 3/1983 | Pierson |
| 4,483,770 | A | | 11/1984 | Casey et al. |
| 4,730,526 | A | * | 3/1988 | Pearl et al. ..................... 83/76.1 |
| 2009/0314721 | A1 | | 12/2009 | Wood et al. |
| 2011/0266212 | A1 | * | 11/2011 | Quilter et al. ................. 210/400 |

OTHER PUBLICATIONS

The International Search Report and Written Opinion dated Jan. 8, 2013, 8 pages.

* cited by examiner

*Primary Examiner* — Benjamin Kurtz
(74) *Attorney, Agent, or Firm* — Jeffrey A. Sharp; Aaron M. Pile; Daniel DeJoseph

(57) ABSTRACT

An adjustable vacuum pan assembly [190] for a belt filter [900] is disclosed. The adjustable vacuum pan assembly [190] comprises an arm [140] configured to be attached to a frame portion [930] of the filter [900], a vacuum pan [150] adjustably connected to the arm [140], and a cam [170] operatively coupled to the arm [140]. The cam [170] is rotatable with respect to the arm [140] and has a peripheral surface which contacts a portion [157] of the vacuum pan [150]. The assembly [190] further comprises a locking member [169] which serves to hold the cam [170] against rotation with respect to the arm [140]. Varying an angular rotational position of the cam [170] effectively varies a spacing between the vacuum pan [150] and the arm [140], thereby providing an amount of misalignment compensation therebetween. Retrofit kits for a preexisting conventional filter [900] and methods of providing increased adjustability to a filter [900] are also disclosed.

27 Claims, 6 Drawing Sheets

ADJUSTABLE VACUUM PAN ASSEMBLIES FOR BELT FILTERS

CROSS-REFERENCE TO RELATED APPLICATIONS

This application claims priority to U.S. Provisional Patent Application Ser. No. 61/555,040 filed on 3 Nov. 2011.

BACKGROUND OF THE INVENTION

This invention relates to filtration processes and equipment, and more particularly to horizontal belt filter apparatus, particularly for use in minerals processing.

FIGS. 1, 2, and 4 show a horizontal belt filter 900 having a conventional vacuum pan assembly 990. Horizontal belt filter 900 comprises a frame 930, a plurality of return rollers 920 and a drainage belt 910 having a number of pores 912 provided therein which are configured to pass fluid and moisture from a slurry (not shown) to the conventional vacuum pan assembly 990 positioned below the belt 910. Belt 910 supports filter media 914 such as a filter cloth. Conventional vacuum pan assembly 990 comprises a swing arm 940 which is pivotally attached to said frame 930 by way of a pivot bracket 941 having a first pivot member 946, and a second pivot member 936 provided to the frame 930. A vacuum pan 950 having an elongated inlet 951 and a channel 952 is mounted to the swing arm 940 via a number of fasteners 953 passing through at least one mount 957 on the pan 150. A wear plate 959 having a number of apertures 955 may serve as a sacrificial interface between the pan 150 and the belt 910. Apertures 955 in the wear plate 959 allow fluid and moisture from slurry passing through pores 912 to enter the conventional vacuum pan assembly 990 positioned below the belt 910. A first securing portion 944 is provided to a distal end of the swing arm 940, opposite the pivot bracket 941 and the first pivot member 946. The first securing portion 944 is configured to mate with a complementary second securing portion (not shown) provided at a predetermined location on the frame 930 of the filter 900. Engagement between the first securing portion 944 and the second securing portion (not shown) serves to keep vacuum pan 950 and wear plate 959 in close communication with belt 910.

As best shown in FIGS. 2 and 3, at least one shim 960 is typically placed between the swing arm 940 and mount 957 to better align the inlet 951 of the pan 950 with the pores 912 in the belt 910 and sometimes to adjust the tilt of the pan 950 to match an inclination of the belt 910. The exact number and/or configuration of shims 960 may vary between each swing arm 940 and mount 957 along the length of the filter 900, and will frequently change as portions of wear plate 959 dimensionally change (e.g., in thickness) due to continued friction with the belt 910.

A significant disadvantage of using shims 960 is that when used wear plates 959 are replaced with thicker new wear plates (or when any portion of the conventional vacuum pan assembly 990 such as the pan 950 itself needs to be removed for routine maintenance or cleaning), there is no simple way to restore the position of the pan 950 to a "factory default" alignment configuration with respect to the swing arm 940. In other words, shims 960 necessary for use with thin worn wear plates 959, which are removed from the assembly 990 to accommodate thick new wear plates 959, will need to be replaced in a new configuration in a lesser number in order to bring the pan 950 into proper re-alignment with the belt 910. Such re-configuring and adjustment steps require unnecessary downtime and labor.

To add to the abovementioned problem, shims are typically custom-fabricated at each shim location. Multiple shims of varying thickness are required at each shim point to achieve the desired elevation required for belt-to-pan alignment and proper vacuum seal between the belt 910 and vacuum pan assembly 990. Shims 960 are frequently lost, mixed up or accidentally confused with other shims 960, and additional shims 960 may need to be quickly fabricated and provided in the field in order to adjust the positioning of the vacuum pan 950 during routine maintenance.

Jack screws often "seize" in place after a short time in operation, thereby resulting in the inability to adjust the elevation or removal of vacuum pan 950 during routine maintenance. Neither shims 960 or jack screws (not shown) provide a quick and efficient way to re-establish "factory-set elevation points" for a vacuum pan 950 after maintenance adjustments are performed.

Conventionally, the horizontal adjustment of vacuum pans 950 typically involves welding an adjusting plate (not shown) to the swing arm in-situ during assembly. As a result of in-situ welding, additional cleaning of the weld area and protective repainting is required. These extra steps add to the total commissioning time and cost. Moreover, welding exposes expensive components (e.g., belt 910) to potential damage.

OBJECTS OF THE INVENTION

It is, therefore, an object of the invention to provide a vacuum pan assembly which reduces down time for users during routine maintenance.

It is also an object of the invention to provide a vacuum pan assembly which requires less shop assembly time and does not require welding and subsequent protective painting.

It is also an object of the invention to provide a vacuum pan assembly adjustment mechanism which is easily adapted for and configured to be used with current filters using shims and jacks, thereby providing a valuable aftermarket conversion kit.

It is also an object of the invention to provide a device which enables a user of a filter to adjust a vacuum pan both vertically and horizontally using a single mechanism.

It is also an object of the invention to provide adjustment means to a vacuum pan which allows horizontal adjustment without the need for a providing a separately-welded adjusting plate, and welding in assembly.

These and many other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

An adjustable vacuum pan assembly for a belt filter is disclosed. The adjustable vacuum pan assembly comprises an arm configured to be attached to a frame portion of the filter, a vacuum pan adjustably connected to the arm, and a cam operatively coupled to the arm. The arm may comprise a swing arm which is pivotally attached to said frame portion of the belt filter. The cam is rotatable with respect to the arm and has a peripheral surface which contacts a portion of the vacuum pan. The assembly further comprises a locking member which serves to hold the cam against rotation with respect to the arm. Varying an angular rotational position of the cam effectively varies a spacing between the vacuum pan and the arm, thereby providing an amount of misalignment compensation therebetween. In some embodiments, the cam is operatively coupled to the arm via a bracket which may be adjustably positionable with respect to the arm in at least one direction. In some embodiments, the locking member selectively engages one of a plurality of engagement surfaces on the cam to maintain a spacing between the vacuum pan and the arm. In some embodiments, means for applying a torque to the cam is provided. In some embodiments, the cam rotates about an axis defined by a pin, and the position of the cam along said axis may be adjusted and then limited or maintained by a stop one or more retainers.

A belt filter is also disclosed, wherein the belt filter comprises an adjustable vacuum pan assembly as described above.

A retrofit kit for a filter is also disclosed. The kit comprises a bracket configured to be mounted to an arm or other frame portion of a filter, a cam configured to be operatively coupled to said bracket, and a locking member configured to hold the cam against rotation with respect to the bracket. The arm may comprise a swing arm which is pivotally attached to said frame portion of the belt filter. The cam is rotatable with respect to the bracket and has a peripheral surface which is configured to contact a portion of a vacuum pan or other component. In use, varying an angular rotational position of the cam effectively varies a spacing between a vacuum pan and said bracket, thereby providing an amount of misalignment compensation therebetween.

Also disclosed is a method of providing increased adjustability to a conventional vacuum pan assembly in a filter. The method comprises the steps of providing a cam to an arm or frame portion of a filter, providing a locking member to hold the cam against rotation with respect to the arm or frame portion, varying an angular rotational position of the cam to effectively vary a spacing between a vacuum pan and the arm or frame portion, thereby providing an appropriate amount of misalignment compensation therebetween, locking the cam from rotation using the locking member, and maintaining an appropriate spacing between a vacuum pan and said arm or frame portion during operation of said filter.

DETAILED DESCRIPTION OF THE INVENTION

Figure 1:
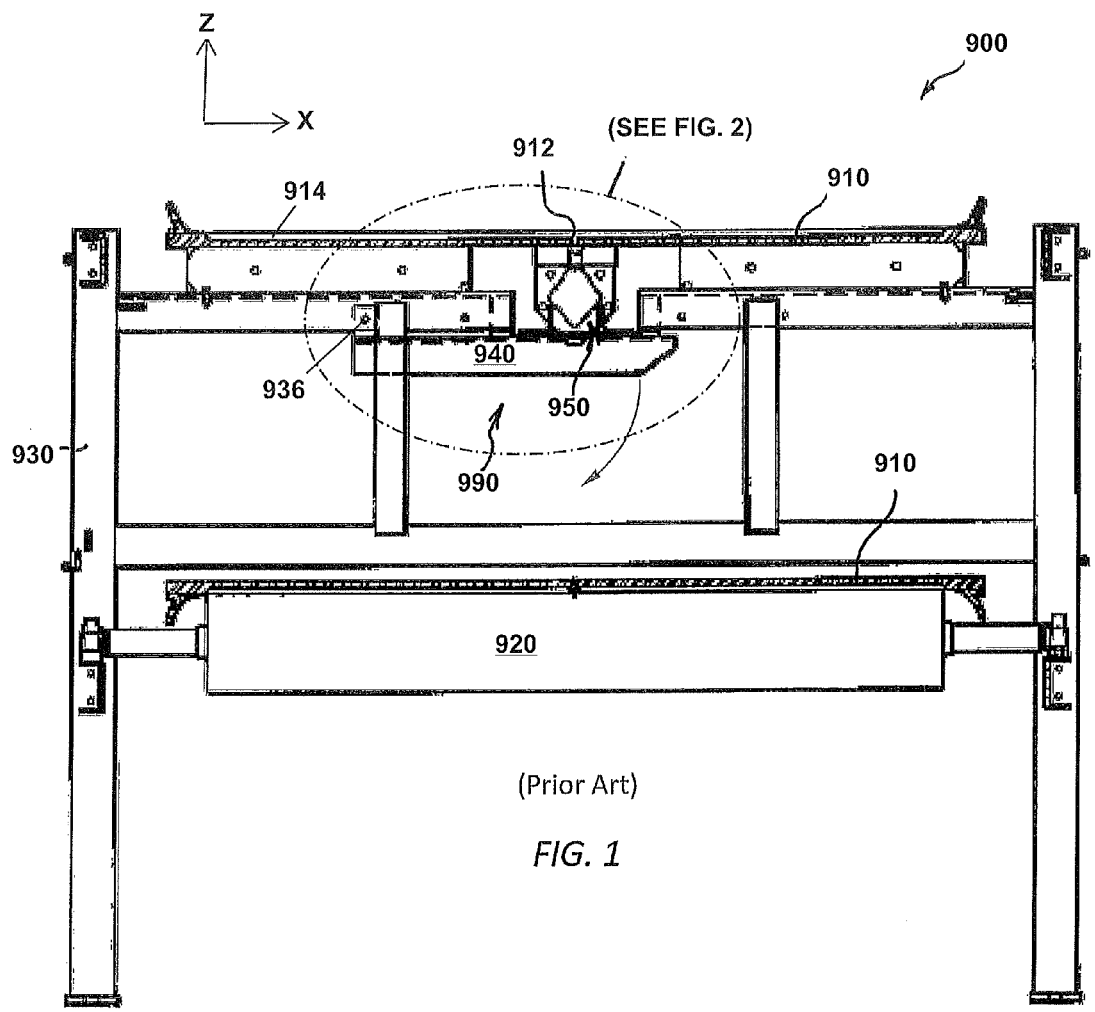
FIG. 1 is an end cross-sectional view of a conventional horizontal belt filter.
Figure 2:
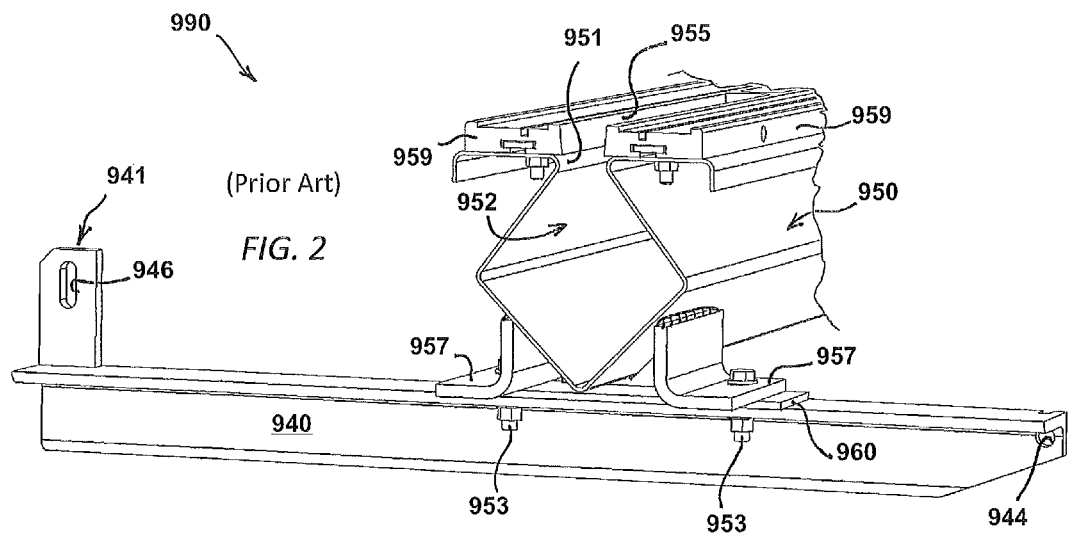
FIG. 2 is a detailed end view of a vacuum pan of the belt filter shown in FIG. 1.
Figure 3:
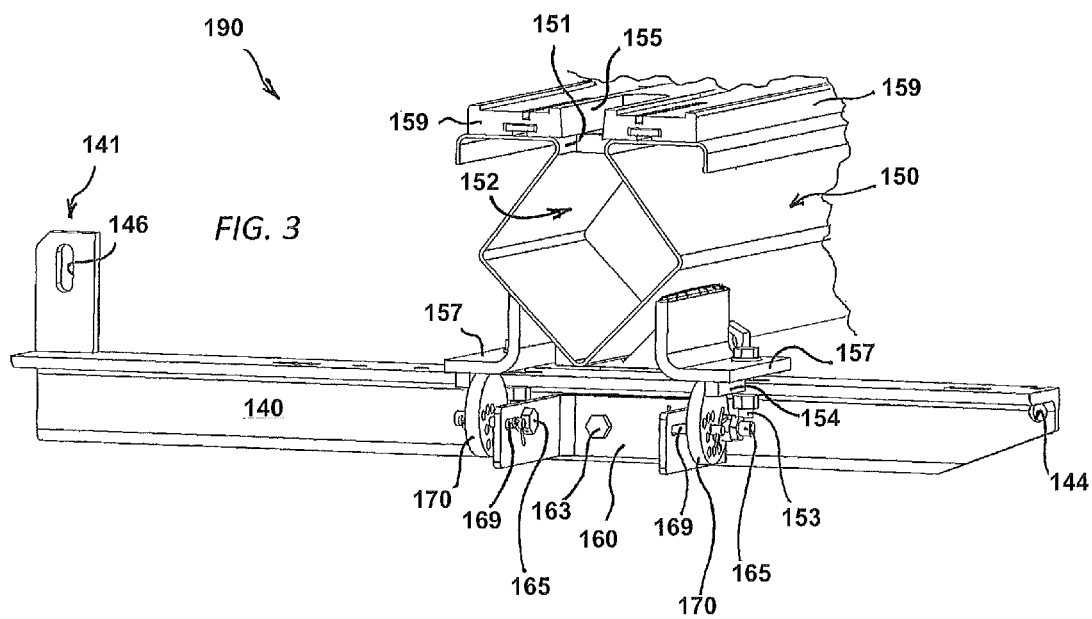
FIG. 3 shows an adjustable vacuum pan according to some embodiments.
Figure 4:
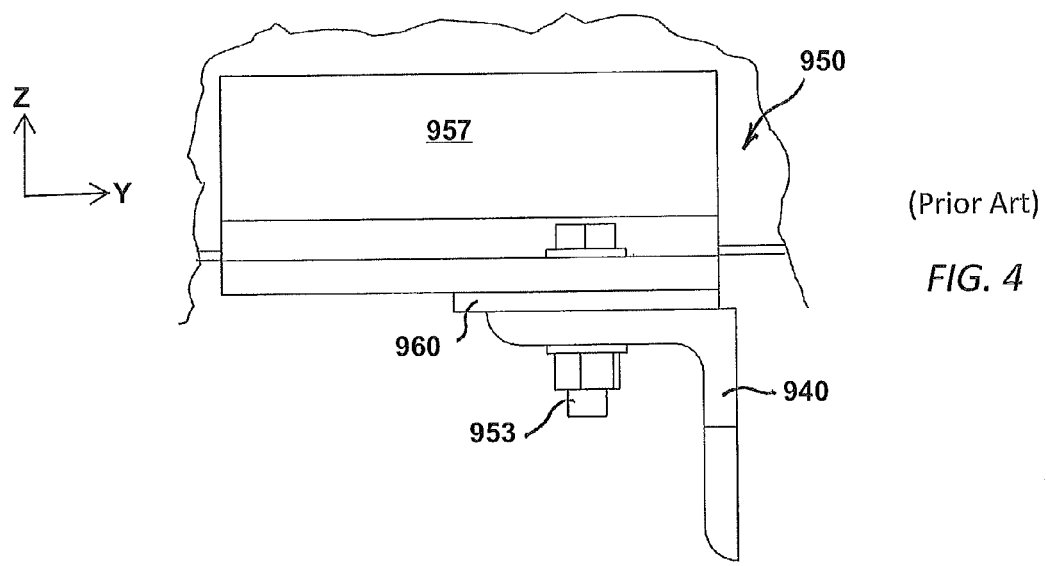
FIG. 4 is a side view of the conventional vacuum pan shown in FIG. 1.
Figure 5:
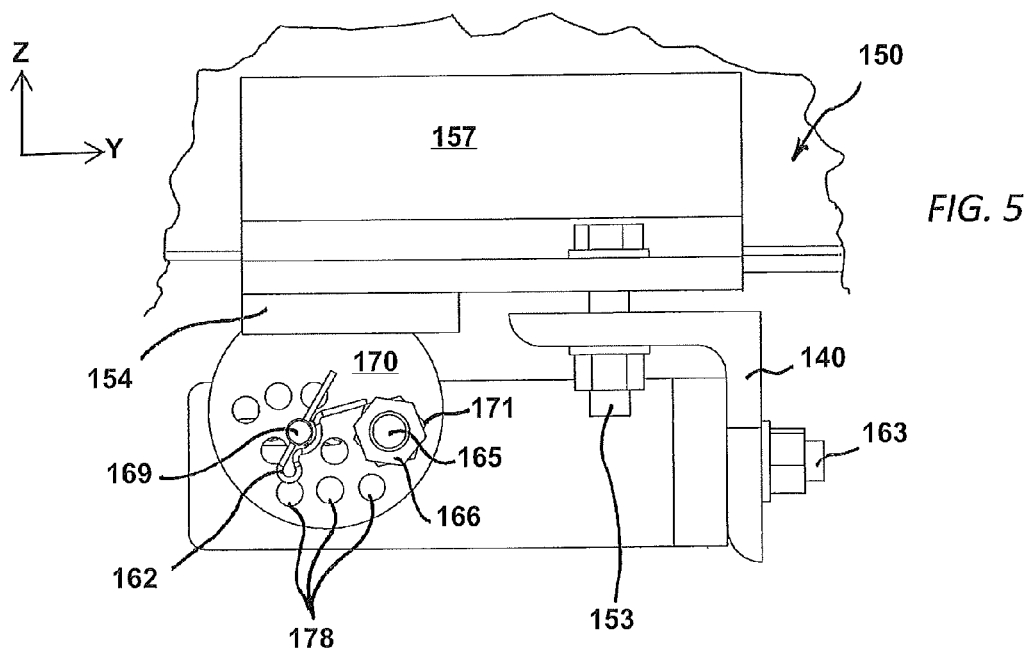
FIG. 5 is a side view of the adjustable vacuum pan shown in FIG. 3.
Figure 6:
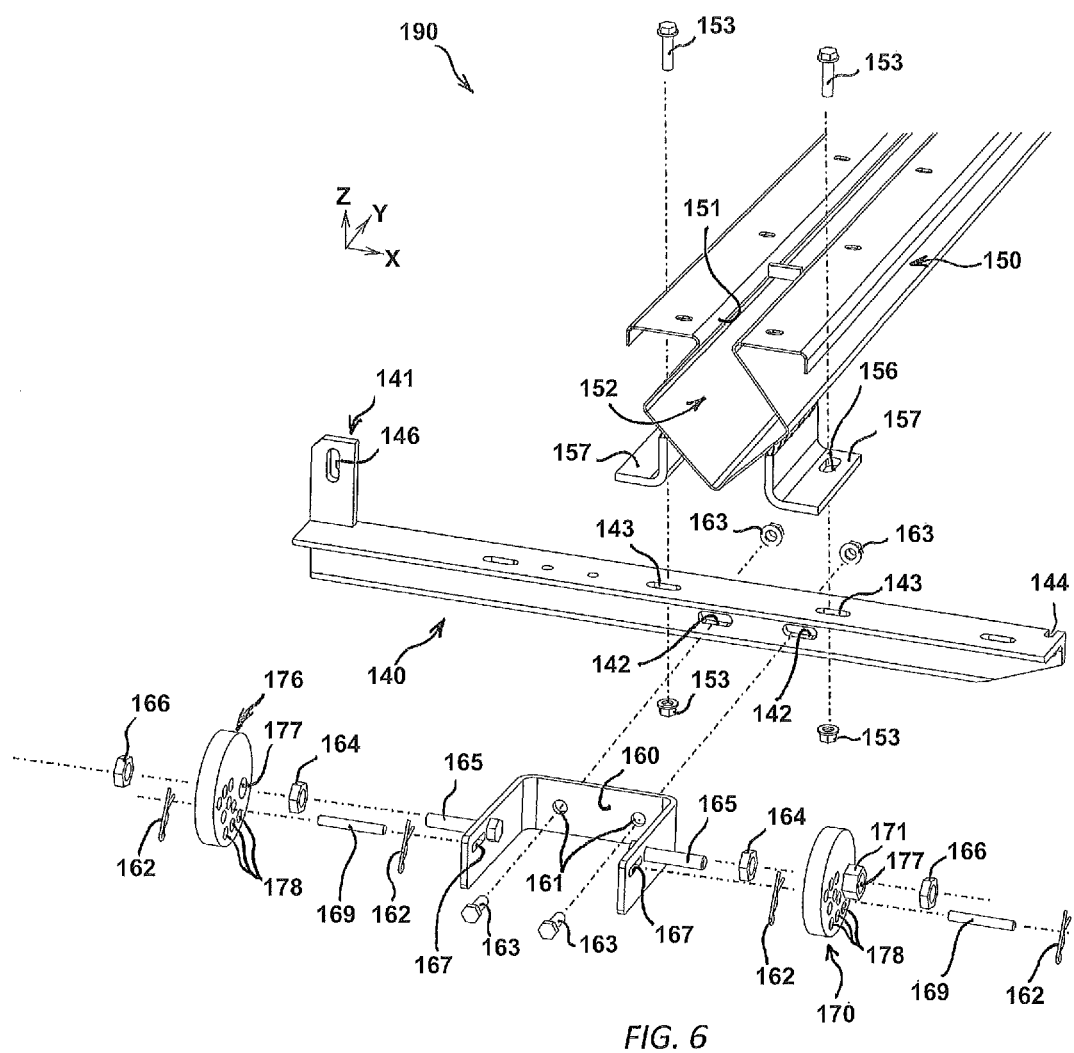
FIG. 6 is a detailed exploded view of the adjustable vacuum pan shown in FIG. 3.

FIGS. 3 and 5-8 show an improved adjustable vacuum pan assembly 190. The vacuum pan assembly 190 comprises a swing arm 140 which is pivotally attached to a frame portion of a filter 900 (e.g., a horizontal belt filter). Swing arm 140 comprises a pivot bracket 141 having a first pivot member 146 configured to communicate with a second pivot member 936 such as a pin, dowel, hinge, fulcrum, or other equivalent device provided to the frame 930 of the filter 900. In the exemplary embodiment shown, first pivot member 146 is provided as an aperture suitable for receiving a pin or rod; however, the first pivot member 146 may equally be a portion of a hinge or other pivoting mechanism without limitation. A vacuum pan 150 having one or more effluent ports 158, an elongated inlet 151, and a channel 152 suitable for collecting, retaining, and delivering fluid and moisture is mounted to the swing arm 140 via at least one fastener 153 passing through at least one mount 157 on the pan 150. One or more wear plates 159 having a number of apertures 155 may serve as a sacrificial interface between the pan 150 and a belt 910. Apertures 155 in each wear plate 159 allow fluid and moisture passing through pores 912 of a belt 910 to enter the vacuum pan assembly 190 positioned below the belt 910. While not shown, it is envisaged that each wear plate 159 may alternatively comprise two parallel wear plates having therebetween, a spacing which similarly allows fluid to pass. A first securing portion 144 is provided to a distal end of the swing arm 140, opposite the pivot bracket 141 and first pivot member 146. The first securing portion 144 is configured to mate with a complementary second securing portion (not shown) provided at a predetermined location on the frame 930 of a filter 900. Engagement between the first securing portion 144 and the second securing portion (not shown) serves to keep vacuum pan 150 and wear plate 159 in close communication with belt 910.

Fine adjustability of spacing between the pan 150 and the swing arm 140 is achieved through the use of at least one cam 170 which initially supports the mount 157 of the pan 150 in at least a Z-axis direction extending between an upper and lower portion of the filter 900. Cam 170 is rotatable through a range of motion in at least one rotational degree of freedom. The at least one rotational degree of freedom is shown to be about an axis which is generally parallel with a long axis of the swing arm 140 extending between the pivot bracket 141 and first securing portion 144. However, while not shown, said at least one rotational degree of freedom may alternatively be about an axis which is generally perpendicular with respect to a long axis of the swing arm 140 as will be described in more detail below. In some preferred embodiments, the cam 170 is round and allows independent vertical adjustment of the pan 150 in the Z-axis direction in 0.5-5 mm increments, and even more preferably between 1 mm and 3 mm increments—for example, 1.5 mm increments.

Swing arm 140 comprises a set of one or more oblong openings 142 which may extend longitudinally in an X-axis direction within an X-Z plane which is generally transverse to the filter 900. One or more fasteners 163 extend through said oblong openings 142 and hold a bracket 160 to the swing arm 140. The elongated nature of the oblong openings 142 allows bracket 160 to be mounted to the swing arm 140 with some amount of positional adjustability in at least said X-axis direction. In the embodiment shown, bracket 160 comprises a set of one or more openings 161 which are configured to receive the fasteners 163. However, it is contemplated that while not shown, oblong openings 142 may instead be provided on the bracket 160, and openings 161 may be provided to the swing arm 140. Moreover, other means for X-axis positional adjustment may be provided, including, but not limited to: tracks, channels, sliding dovetail joints, linear bearings, or the like.

Swing arm 140 further comprises a set of one or more oblong openings 143 which may extend longitudinally in an X-axis direction within an X-Y plane which is generally parallel to belt 910. One or more fasteners 153 extend through said oblong openings 143 and hold mount 157 to the swing arm 140. The elongated nature of the oblong openings 143 allows pan 150 to be mounted to the swing arm 140 with some amount of positional adjustability in at least the X-axis direction. Similarly, one or more mounts 157 provided to the vacuum pan 150 may comprise a set of one or more oblong openings 156 which may extend longitudinally in a Y-axis direction within said X-Y plane. Fasteners 153 extend through said oblong openings 143, 156 and secure the mount 157 (and therefore, pan 150) to the swing arm 140. The elongated nature of the oblong openings 156 allows pan 150 to be mounted to the swing arm 140 with some amount of positional adjustability in at least the Y-axis direction. While not shown, it is contemplated that oblong opening sets 143 and 156 may be interchanged without negatively affecting function. Moreover, oblong openings 143, 156 may be collectively replaced with other means for X-Y planar positional adjustment including, but not limited to: perpendicular tracks, perpendicular channels, perpendicular sliding dovetail joints, planar bearings, etc. While specifically shown as nuts and bolts, it should be noted that fasteners 153, 163 according to the invention may be of any suitable type including, but not limited to: headed rivets, clevis pins, weld studs, and the like.

Bracket 160 comprises a pin 165 which is configured to receive a cam 170 via an aperture 177 provided to said cam 170 which is offset of center (i.e., the cam 170 is eccentric). Pin 165 may be modular (e.g., provided as a bolt secured to the bracket 160 with a nut), or pin 165 may be permanently attached to the bracket (e.g., a weld stud).

A torque boss 171 may be provided to the cam 170. In some embodiments, torque boss 171 is concentric or otherwise co-axial with said aperture 177. Cam 170 further comprises a plurality of engagement surfaces 178 which are displaced various distances from said aperture 177 and are positioned at different locations relative to the aperture 177. The engagement surfaces 178 are configured to accept a locking member 169 which is adapted to fix the cam 170 in place in at least 5 degrees of freedom with respect to the bracket 160. In the very least, locking member 169 prevents a rotational movement of the cam 170. In some embodiments, cam 170 may be permitted to move in a direction along the axis of pin 165 and aperture 177 (i.e., in an X-axis direction) and contact a stop 154 provided on the pan 150 or pan mount(s) 157 or other portion of the assembly 190 in order to limit lateral movement of the cam 170. Smooth peripheral surfaces on the cam 170 enable some amount of horizontal displacement of the cam 170 in the X-axis direction or Y-axis direction, without affecting the vertical positioning of the vacuum pan 150 in the Z-axis direction, thereby eliminating the need for an additional adjusting plate and the step of welding said adjusting plate to the assembly 990 in-situ. If desired, the cam 170 may be fixed in 6 degrees of freedom relative to the swing arm 140 by one or more retainers 164, 166 located on either side of the cam. As shown, in some embodiments, retainers 164, 166 may comprise threaded lock nuts which engage threads provided to pin 165. In other embodiments (not shown), retainers 164, 166 may comprise internal lock washers having biting teeth in the internal diameter surfaces which lock to pin 165 when axially pressed axially onto pin 165. In yet even other embodiments, retainers 164, 166 may comprise small locking detent pins, positive lock pins, or set screws which transversely engage the pin 165.

In use, an operator inputs a torque on the torque boss 171, which in turn rotates cam 170 about pin 165. Outer peripheral surfaces of cam 170 ride/slide along mount 157, which acts as a "follower". As cam 170 is rotated, pan 150 moves up or down in a Z-axis direction, thereby increasing or decreasing a distance between the belt 910 and the adjustable vacuum pan assembly 190. Once the desired position of the adjustable vacuum pan assembly 190 is set in the Z-axis direction, the spacing between belt 910 and wear plate 159 can be reversibly set in place by engaging a locking member 169 with one of the engagement surfaces 178 provided on the cam 170. Engagement surfaces 178 are preferably marked with indicia to indicate factory set points and indicate an amount of adjustment (e.g., in millimeters). This eliminates the need for a maintenance worker to go through several step iterations to realign the vacuum pan 150 following routine maintenance or disassembly.

In the particular embodiment shown, engagement surfaces 178 are apertures which are configured to receive a locking member 169 in the form of a pin. At least one oblong opening 167 may extend longitudinally in a Y-axis direction in a median/sagittal Y-Z plane. Locking member 169 may extend through said oblong opening 167 and thereby hold cam 170 against rotational freedom about pin 165. Securement of locking member 169 may be facilitated by a retainer 162 provided on both an inside portion of bracket 160, and an outside portion of bracket 160, wherein the retainers 162 communicate with the locking member 169 and sandwich the oblong opening 167 and cam 170 therebetween. Consequently, pan 150 may be propped up to a desired elevation with respect to the belt 910 in at least a Z-axis direction.

The elongated nature of the one or more oblong openings 167 allows cam 170 to be fixedly positioned to the bracket 160 in a plurality of rotational angles utilizing a "peg-in-hole" configuration. However, while not shown, it is contemplated that oblong opening 167, retainer 169, and engagement surfaces 178 may be replaced with other means for securing against rotation of the cam 170 about pin 165, including, but not limited to: pawl and ratchet systems, worm drives (e.g., wherein peripheral cam surfaces are toothed), clamp members, and/or semi-permanent tack welds or other form of reversible or temporary adhesive bonding. While specifically shown as clips, it should be noted that retainers 162 according to the invention may be of any suitable type including, but not limited to: headed rivets, clevis pins, set screws, and the like.

Once the Z-axis position of the pan 150 is set by cam 170 and fixed by locking member 169, fastener 153 may be fully tightened or otherwise engaged to further secure the pan 150 to the swing arm 140 in at least a Z-axis direction. However, prior to setting fastener 153, small horizontal positional adjustments of the vacuum pan 150 relative to belt 910 may be made by loosening fasteners 153, 163 and subsequently sliding bracket 160 along the swing arm 140 in the X-axis direction, wherein the fasteners 163, 153 slide in oblong openings 142, 143, respectively. The bracket 160 and pan 150 may then be fixed into place with respect to the swing arm 140 by tightening fasteners 153, 163.

Alternatively, and more preferably, horizontal positional adjustments of the vacuum pan 150 relative to belt 910 may be made by loosening fastener 153 and subsequently sliding pan 150 along the swing arm 140 in the X-axis direction to a desired location, wherein the fasteners 153 slide in oblong openings 143 of the swing arm 140. Securement of the pan 150 with respect to the swing arm 140 begins by tightening fasteners 163 so as to secure bracket 160 to swing arm 140. Retainers 164. 166 provided on pin 165 which extends from the bracket 160 are positioned along the pin 165 in an X-axis direction so as to move cam 170 laterally against stop 154. Forces acting in the X-axis direction are applied to the stop 154 by the cam 170 and move or bend the pan 150 into longitudinal alignment with pores 912 in the belt 910. The Z-axis position of the pan 150 may then be set by rotating cam 170 about pin 165 to a desired location, and then fixing the rotational position of cam 170 with locking member 169. Thereafter, fastener 153 may be fully tightened or otherwise engaged to secure the pan 150 to the swing arm 140 in at least a Z-axis direction.

A contractor or other entity may provide a belt filter, vacuum pan assembly, or component of vacuum pan assembly, or operate a belt filter or vacuum pan assembly in whole, or in part, as shown and described. For instance, the contractor may receive a bid request for a project related to designing or operating a belt filter or vacuum pan assembly, or the contractor may offer to design such a system or a process for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component of the devices disclosed, or of other devices used to provide said devices. The contractor may also survey a site and design or designate one or more storage areas for stacking the material used to manufacture the devices, or for storing the devices and/or components thereof. The contractor may also maintain, modify, or upgrade the provided devices. The contractor may provide such maintenance or modifications by subcontracting such services or by directly providing those services or components needed for said maintenance or modifications, and in some cases, the contractor may modify a preexisting conventional filter, vacuum pan assembly, or parts thereof with a "retrofit kit" to arrive at a modified filter system comprising one or more method steps, devices, components, or features of the systems and processes discussed herein.

Although the invention has been described in terms of particular embodiments and applications, one of ordinary skill in the art, in light of this teaching, can generate additional embodiments and modifications without departing from the spirit of or exceeding the scope of the claimed.

For example, it is envisaged that swing arm 140 and corresponding vacuum pan 150 may comprise different shapes and sizes depending on the overall size and design specifications of a filter 900. Moreover, while oblong openings 142, 143, 156, 167 are primarily shown in the drawings as through holes, oblong openings may be blind openings and/or may comprise any one or more of the following without limitation: cutouts, a series of closely-spaced non-oblong apertures (threaded or non-threaded), notches, detent configurations, pockets, pawl and ratchet adjustment mechanisms, grooves, channels, depressions, dovetails, and/or undercuts. Similarly, male members shown herein such as locking member 169 may comprise threads, for example, in the form of a set screw.

Furthermore, features and components of the adjustable vacuum pan assembly 190 may be modular, removable, "bolt-on", or "weld-on" components which are provided individually or collectively within a "retrofit kit". Such components may therefore be interchanged with or added to preexisting conventional vacuum pan assemblies 990 to achieve the benefits of the invention. In some instances, a retrofit kit may comprise one or more mounts 157 or adapters to accommodate preexisting conventional mounts 957. Said adapters can be bolted or welded to preexisting conventional mounts 957 or other portions of a preexisting conventional vacuum pan 950. Such adapters may comprise one or more stops 154, additional flanges or flange extenders, extension members, spacers, or one or more universal mounting features such as oblong openings 156 which are configured to accept at least one fastener 153.

It should be known that in some embodiments, torque boss 171 may be eliminated in favor of other means for applying a torque to the cam 170. Such means may comprise, for instance, torque-application surfaces provided as one or more "flats" which are located at selected peripheral locations of the cam 170. Such means may also comprise a lever or handle which extends from the cam, or a peripheral cavity which is engagable by a separate torque arm or cheater bar.

It is contemplated that in some embodiments, male and female components disclosed herein may be reversed and still be within the scope of the disclosure. For example, male pin 165 provided to bracket 160 and female aperture provided to cam 170 may be reversed so that the pin 164 extends from the cam 170 and into the bracket 160. Similarly, while engagement surfaces 178 are shown to be provided on the cam 170, and oblong opening 167 is shown to be provided on the bracket 160, the two may obviously be reversed such that the engagement surfaces are provided on the bracket 160, and oblong opening 167 is provided on the cam 170.

Figure 7:
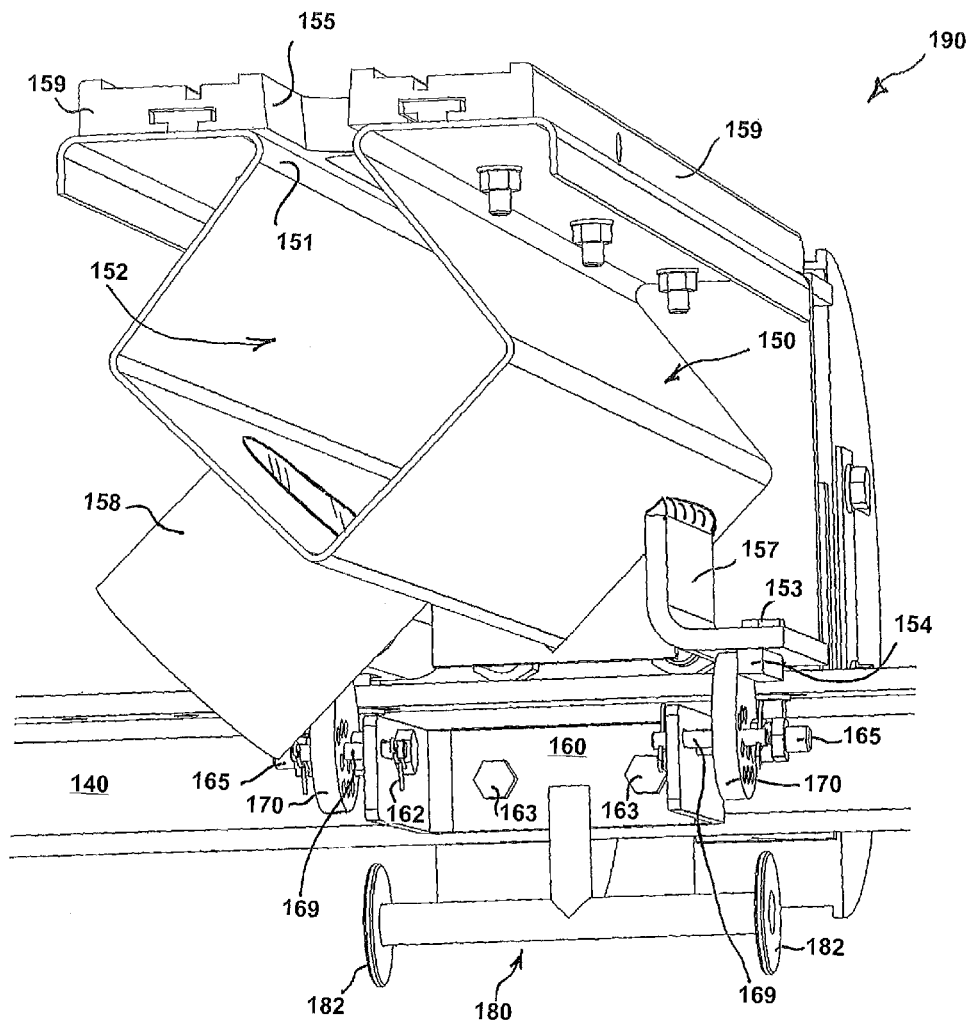
FIG. 7 is an isometric cross-sectional view of the adjustable vacuum pan shown in FIG. 3; and, FIG. 8 is broad isometric view of the adjustable vacuum pan shown in FIG. 3.
Figure 8:
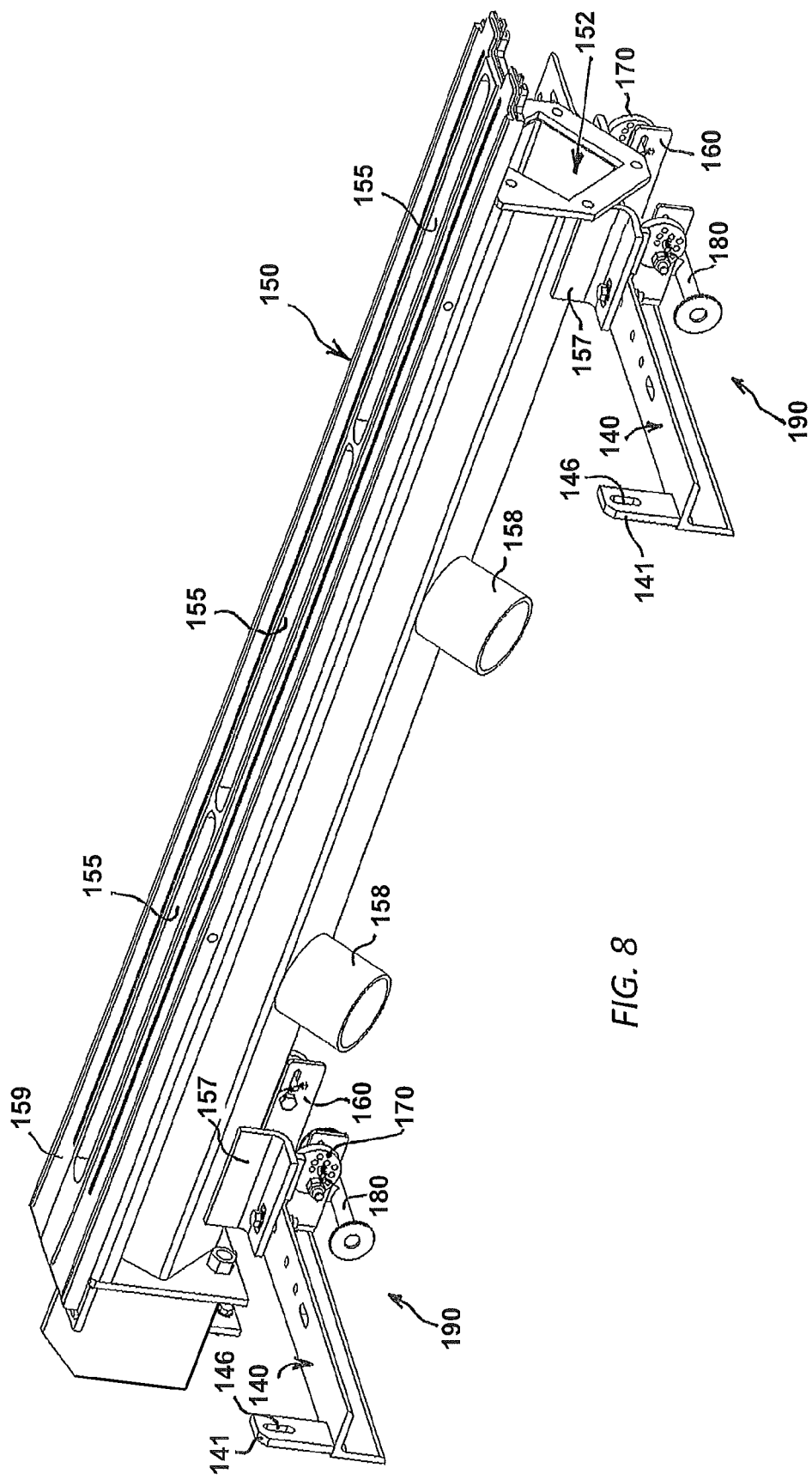

Moreover, the joining of fasteners 153, 163 may be accomplished using threaded connections, plastic deformation, welding, gluing, combinations thereof, or other equivalent means without limitation. Mounts 157 and/or fasteners 153, 163 may be provided in any number or configuration which is suitable for the intended purpose. As shown in FIGS. 7-8, brackets 160 according to the invention may further comprise one or more wear belt guides 180—each having one or more rollers or bearing members 182 provided thereon to provide support and/or lateral guidance for a wear belt (not shown) which travels within upper grooves formed in wear plate 159 and contacts belt 910.

Furthermore, the number and configuration of components described may vary. For instance, while two cams 170 are shown in FIGS. 4-8, a single cam 170 or more than two cams 170 may be employed without departing from the scope of the invention. Moreover, while cams 170 are shown to be mounted to the swing arm 140, they may inversely be connected to mounts 157, wherein peripheral surfaces of the cam 170 engage a portion of the swing arm 140 to effectively vary a spacing therebetween. Alternatively, cams 170 may be provided to the swing arm 140 directly, without the need for a bracket 160. This may be accomplished, for example, by orienting the cam 170 ninety degrees from what is shown in the drawings, so that it is parallel to the swing arm 140, providing pin 165 directly to the swing arm 140—on which the cam 170 rotates, and providing a locking member 169 which engages or otherwise communicates with the swing arm 140 to prevent rotation of the cam 170 relative to the swing arm 140.

In some instances, swing arm 140 may comprise a portion of a linkage (e.g., of the four-bar type), which moves pan 150 up and down in a Z-axis direction. Or the swing arm 140 may be configured to "tilt" or pivot with respect to the belt 910 and travel in an arcuate transverse path as shown. Additionally, bracket 160 may be mounted to other types of vacuum pan 150 raising and lowering systems such as those disclosed in U.S. Pat. No. 4,336,139, U.S. Pat. No. 4,080,298, U.S. Pat. No. 3,992,298, and U.S. Pat. No. 4,671,876. In some instances, swing arm 140 may not necessarily be configured to "swing" at all. In other words, it is envisaged that an "arm", where the term is used herein, may simply comprise a static portion of a filter's frame 930, or may comprise an arm 140 which is connected at both ends to other frame portions 930. Such connections may be realized using welding, bolting, or adjustable mounting means. The arm 140 may also be moved linearly in a Z-axis direction with respect to said belt 910 without swinging, for example, via the use of one or more mechanical actuators, compressible or incompressible fluid cylinders, or electric solenoids. In some embodiments, arm 140 may ride on a track, and cams 170 may be fixed to frame portions 930 which are adjacent to end portions of the arm 140. Z-axis positioning and tilt of the arm 140 with respect to frame 930 may be adjusted by rotating and then subsequently immobilizing the cams 170 relative to the frame 930 using a locking member 169.

It should also be noted that while shown specifically on a horizontal belt filter 900, adjustable vacuum pan assemblies 190 of the invention may be used in other applications requiring quick fine adjustment between two adjacent components. For example, assemblies 190 and components thereof which are shown and described herein may have equal applicability on table filters and belt filter presses.

Accordingly, it is to be understood that the drawings and descriptions herein are proffered by way of example to facilitate comprehension of the invention and should not be construed to limit the scope thereof.

REFERENCE NUMERAL IDENTIFIERS

900 Filter
910 Drainage belt
912 Pores
914 Filter media
920 Return roller
930 Frame
936 Second pivot member
940 Swing arm
941 Pivot bracket
944 First securing portion
946 First pivot member
950 Pan
951 Inlet
952 Channel
953 Fastener
955 Aperture
957 Mount
959 Wear plate
960 Shim
990 Conventional vacuum pan assembly
140 Swing arm
141 Pivot bracket
142 Oblong opening (X-axis direction)
143 Oblong opening (X-axis direction)
144 First securing portion
146 First pivot member
150 Pan
151 Inlet
152 Channel
153 Fastener
154 Stop
155 Aperture
156 Oblong opening (Y-axis direction)
157 Mount
158 Port
159 Wear plate
160 Bracket
161 Opening
162 Retainer
163 Fastener
164 Retainer
165 Pin
166 Retainer
167 Oblong opening (Y-axis direction)
169 Locking member
170 Cam
171 Torque boss
177 Aperture
178 Plurality of engagement surfaces
180 Wear belt guide
182 Roller or bearing member
190 Adjustable vacuum pan assembly

What is claimed is:

1. A belt filter [900] having an adjustable vacuum pan assembly [190], the adjustable vacuum pan assembly [190] comprising:
    an arm [140] attached to a frame portion [930] of the belt filter [900];
    a vacuum pan [150] adjustably connected to the arm [140];
    a cam [170] operatively coupled to the arm [140], the cam [170] being rotatable with respect to the arm [140] and having a peripheral surface which contacts a portion [157] of the vacuum pan; and
    a locking member [169] configured to hold the cam [170] against rotation with respect to the arm [140];
    wherein varying an angular rotational position of the cam [170] effectively varies a spacing between the vacuum pan [150] and the arm [140] thereby providing an amount of misalignment compensation therebetween.

2. The belt filter [900] according to claim 1, wherein the arm [140] is a swing arm which is pivotally attached to said frame portion [930] of the belt filter [900].

3. The belt filter [900] according to claim 1, wherein the cam [170] is operatively coupled to the arm [140] via a bracket [160], which is adjustably positionable with respect to the arm [140] in at least one direction.

4. The belt filter [900] according to claim 1, wherein the locking member [169] selectively engages one of a plurality of engagement surfaces [178] on the cam [170] to maintain a spacing between the vacuum pan [150] and the arm [140].

5. The belt filter [900] according to claim 1, wherein the cam [170] comprises means [171] for applying a torque thereto.

6. The belt filter [900] according to claim 1, wherein the cam [170] rotates about an axis defined by a pin [165], wherein the position of the cam [170] along said axis may be adjusted and then limited or maintained.

7. The belt filter according to claim 6, wherein the position of the cam [170] along said axis is limited or maintained by a stop [154].

8. The belt filter according to claim 6, wherein the position of the cam [170] along said axis is limited or maintained by one or more retainers [164, 166].

9. An adjustable vacuum pan assembly [190] comprising:
    an arm [140] configured to be attached to a frame portion [930] of a filter [900];
    a vacuum pan [150] adjustably connected to the arm [140];
    a cam [170] operatively coupled to the arm [140], the cam [170] being rotatable with respect to the arm [140] and having a peripheral surface which contacts a portion [157] of the vacuum pan; and
    a locking member [169] configured to hold the cam [170] against rotation with respect to the arm [140];
    wherein varying an angular rotational position of the cam [170] effectively varies a spacing between the vacuum pan [150] and the arm [140] thereby providing an amount of misalignment compensation therebetween.

10. The adjustable vacuum pan assembly [190] according to claim 9, wherein the arm [140] is a swing arm which is pivotally attached to said frame portion [930] of the filter [900].

11. The adjustable vacuum pan assembly [190] according to claim 9, wherein the cam [170] is operatively coupled to the arm [140] via a bracket [160], which is adjustably positionable with respect to the arm [140] in at least one direction.

12. The adjustable vacuum pan assembly [190] according to claim 9, wherein the locking member [169] selectively engages one of a plurality of engagement surfaces [178] on the cam [170] to maintain a spacing between the vacuum pan [150] and the arm [140].

13. The adjustable vacuum pan assembly [190] according to claim 9, wherein the cam [170] comprises means [171] for applying a torque thereto.

14. The adjustable vacuum pan assembly [190] according to claim 9, wherein the cam [170] rotates about an axis defined by a pin [165], wherein the position of the cam [170] along said axis may be adjusted and then limited or maintained.

15. The adjustable vacuum pan assembly [190] according to claim 14, wherein the position of the cam [170] along said axis is limited or maintained by a stop [154].

16. The adjustable vacuum pan assembly [190] according to claim 14, wherein the position of the cam [170] along said axis is limited or maintained by one or more retainers [164, 166].

17. A kit for providing increased adjustability to a conventional vacuum pan assembly [990] the kit comprising:
   a bracket [160] configured to be mounted to an arm [140] or frame portion [130] of a filter [900];
   a cam [170] configured to be operatively coupled to said bracket [160], the cam [170] being rotatable with respect to the bracket [160] and having a peripheral surface which is configured to contact a portion of a vacuum pan [150]; and
   a locking member [169] configured to hold the cam [170] against rotation with respect to the bracket [160];
   wherein in use, varying an angular rotational position of the cam [170] effectively varies a spacing between a vacuum pan [150] and said bracket [160], thereby providing an amount of misalignment compensation therebetween.

18. The kit according to claim 17, wherein the arm [140] is a swing arm which is pivotally attached to said frame portion [930] of the filter [900].

19. The kit according to claim 17, wherein said bracket [160] is operatively coupled to the arm [140] or frame portion [130] of a filter [900], and is adjustably positionable with respect to said arm [140] or frame portion [130] of a filter [900] in at least one direction.

20. The kit according to claim 17, wherein the locking member [169] selectively engages one of a plurality of engagement surfaces [178] on the cam [170] to maintain a spacing between a vacuum pan [150] and a arm [140] or frame portion [130] of a filter [900].

21. The kit according to claim 17, wherein the cam [170] comprises means [171] for applying a torque thereto.

22. The kit according to claim 17, wherein the cam [170] rotates about an axis defined by a pin [165], wherein the position of the cam [170] along said axis may be adjusted and then limited or maintained.

23. The kit according to claim 22, wherein the position of the cam [170] along said axis is limited or maintained by a stop [154].

24. The kit according to claim 22, wherein the position of the cam [170] along said axis is limited or maintained by one or more retainers [164, 166].

25. The kit according to claim 19, further comprising one or more mounts [157] or adapters which are configured to be secured to a preexisting conventional vacuum pan [950] or vacuum pan mount [957].

26. The kit according to claim 25, wherein said one or more mounts [157] or adapters comprise at least one stop [154].

27. A method of providing increased adjustability to a conventional vacuum pan assembly [990] in a filter [900] comprising:
   providing a cam [170] to an arm [140] or frame portion [130] of the filter [900], the cam [170] being rotatable with respect to the swing arm [140] or frame portion [130] and having a peripheral surface which is configured to contact a portion [957], component, or adapter of a preexisting conventional vacuum pan [950]];
   providing a locking member [169] to hold the cam [170] against rotation with respect to the arm [140] or frame portion [130];
   varying an angular rotational position of the cam [170] to effectively vary a spacing between a vacuum pan [150] and the arm [140] or frame portion [130], thereby providing an appropriate amount of misalignment compensation therebetween;
   locking the cam [170] from rotation using the locking member [169]; and
   maintaining an appropriate spacing between a vacuum pan [150] and said arm [140] or frame portion [130].

* * * * *